(12) United States Patent
Setchell et al.

(10) Patent No.: US 12,731,276 B2
(45) Date of Patent: Sep. 8, 2026

(54) NON-CONTACT DEFORMATION MONITORING SYSTEM

(71) Applicant: Imetrum Limited, Bristol (GB)

(72) Inventors: Christopher John Setchell, Bristol (GB); David John Griffin, Bristol (GB); Nicholas Dominic Southerden Burn, Bristol (GB)

(73) Assignee: Imetrum Limited, Bristol (GB)

( * ) Notice: Subject to any disclaimer, the term of this patent is extended or adjusted under 35 U.S.C. 154(b) by 0 days.

(21) Appl. No.: 18/862,037

(22) PCT Filed: Apr. 19, 2023

(86) PCT No.: PCT/GB2023/051024
§ 371 (c)(1),
(2) Date: Oct. 31, 2024

(87) PCT Pub. No.: WO2023/214145
PCT Pub. Date: Nov. 9, 2023

(65) Prior Publication Data

US 2025/0285303 A1 Sep. 11, 2025

(30) Foreign Application Priority Data

May 2, 2022 (GB) ...................................... 2206381

(51) Int. Cl.
*G06T 7/55* (2017.01)
*G06T 7/73* (2017.01)
(Continued)

(52) U.S. Cl.
CPC .................. *G06T 7/55* (2017.01); *G06T 7/73* (2017.01); *H04N 23/56* (2023.01); *H04N 23/90* (2023.01)

(58) Field of Classification Search
None
See application file for complete search history.

(56) References Cited

U.S. PATENT DOCUMENTS 10,796,425 B1 * 10/2020 Patel ..................... G06T 7/0004
2002/0166386 A1 11/2002 Hiyoshi
(Continued)

FOREIGN PATENT DOCUMENTS

CN 101566465 B 4/2011
EP 0129242 A1 12/1984
(Continued)

OTHER PUBLICATIONS

International Search Report mailed Jun. 26, 2023 in corresponding PCT/GB2023/051024, 3 pages.
(Continued)

*Primary Examiner* — Eileen M Adams
(74) *Attorney, Agent, or Firm* — HOVEY WILLIAMS LLP

(57) ABSTRACT

A deformation monitoring system for measuring deformation of an object, the system comprising: a first camera arranged to capture a first image of an object; a second camera arranged to capture a second image of the object, the second camera being in a known orientation relative to the first camera; and a controller arranged to cause the deformation monitoring system to carry out the steps of: imaging the object with the first camera at a first time; imaging the object with the second camera at the first time; determining a first location of a first measurement point on the object at the first time and a first location of a second measurement point on the object at the first time based on the imaging by the first and second cameras at the first time; imaging the object with the first camera at a second time distinct from the first time; imaging the object with the second camera at the second time; determining a location of the first measurement point on the object at the second time and the second measurement point on the object at the second time based on the imaging by the first and second cameras at the second
(Continued)

time; and determining a deformation of the object based on the locations of the first and second measurement points at the first and second times.

21 Claims, 6 Drawing Sheets

(51) Int. Cl.
*H04N 23/56* (2023.01)
*H04N 23/90* (2023.01)

(56) References Cited

U.S. PATENT DOCUMENTS

| | | | | |
|---|---|---|---|---|
| 2006/0115133 | A1 * | 6/2006 | Potter | G06V 10/245 382/128 |
| 2013/0063570 | A1 | 3/2013 | Michopoulos et al. | |
| 2017/0124367 | A1 | 5/2017 | Margalit et al. | |
| 2019/0109984 | A1 * | 4/2019 | Good | H04N 23/74 |
| 2019/0228565 | A1 * | 7/2019 | Yushiya | H04N 21/21805 |
| 2020/0408509 | A1 * | 12/2020 | Riddick | G01N 3/068 |
| 2021/0216950 | A1 * | 7/2021 | Bizoara | G06V 30/424 |
| 2021/0356403 | A1 | 11/2021 | Chiang et al. | |
| 2023/0188833 | A1 * | 6/2023 | Pribble | G06T 7/12 348/242 |

FOREIGN PATENT DOCUMENTS

| | | | |
|---|---|---|---|
| EP | 0497477 | A2 | 8/1992 |
| FR | 2976069 | A1 | 12/2012 |
| JP | 2001-124516 | A2 | 5/2001 |

OTHER PUBLICATIONS

Machine Translation of FR2976069, 5 pages.
Machine Translation of CN101566465, 10 pages.
Bing Pan, “Digital image correlation for surface deformation measurement: historical developments, recent advances and future goals,” Measurement Science and Technology, Jun. 28, 2018, vol. 29, No. 8, 082001, DOI 10.1088/1361-6510/aac55b, abstract only, 6 pages.
Written Opinion mailed Jun. 26, 2023 in corresponding PCT/GB2023/051024, 3 pages.
Examination Report mailed Jun. 25, 2024 in corresponding British Patent Application No. GB2206381.2, 4 pages.
Combined Search and Examination Report mailed Oct. 31, 2022 in corresponding British Patent Application No. GB2206381.2, 9 pages.
Machine Translation of JP2001124516, 4 pages.
Examination Report mailed Mar. 19, 2026 in corresponding Indian Patent Application No. 202417084741, 11 pages.

* cited by examiner

NON-CONTACT DEFORMATION MONITORING SYSTEM

RELATED APPLICATIONS

This application is the U.S. National Stage of International Patent Application No. PCT/GB2023/051024, filed Apr. 19, 2023, which is hereby incorporated by reference in its entirety, and which claims priority to GB Patent Application No. 2206381.2, filed May 2, 2022.

FIELD OF THE INVENTION

This invention relates to a deformation monitoring system and a method of monitoring deformation.

BACKGROUND

All physical objects undergo deformation of their shape whenever they are subjected to force, changes in temperature, relaxation of residual stress, etc. For example, the components of a car's suspension (e.g. push-rods, wishbones, drive-shafts, etc.) will all flex, twist, compress & stretch as the car is driven along a road. During the design phase of those same components, they may have been placed in test rigs that deform the components by simulating the forces experienced during use. Measurement of those deformations allows engineers to optimise the design of the components in order to reduce cost & weight whilst also ensuring that the component doesn't fail during use.

As a further example, when a material (e.g. carbon composite) is being manufactured, samples of the manufactured material may be placed in test machines that deform the sample by applying forces (often tensile or compressive). Measuring the resulting deformation allows the properties (e.g. modulus) of that material to be measured as part of a quality control or other testing process.

Whatever the object, and regardless of whether the deformations are created via a test rig or via real use, there is a frequent need to precisely measure the deformation of objects.

Traditionally, the measurement of deformation has been performed using 'contacting' sensors such as digital test indicators, linear variable differential transformers and strain gauges. Such devices can typically only measure a single location on the object and can only measure the deformation along a single axis. Gaining a detailed understanding of the deformation may therefore require multiple of such sensors to be installed on the object. This tends to make it time consuming and expensive to use such sensors and the associated wiring quickly becomes cumbersome and prone to faults. Additionally, each sensor that is contacting the object will be exerting a force on the object and will therefore, to some degree, affect the deformation that is being measured. In some cases, the forces exerted by the sensor can dramatically affect the deformation of the object, making it difficult to acquire accurate deformation data.

SUMMARY OF THE INVENTION

According to a first aspect of the present invention, there is provided a deformation monitoring system for measuring deformation of an object, the system comprising: a first camera arranged to capture a first image of an object; a second camera arranged to capture a second image of the object, the second camera being in a known orientation relative to the first camera; and a controller arranged to cause the deformation monitoring system to carry out the steps of: imaging the object with the first camera at a first time; imaging the object with the second camera at the first time; determining a first location of a first measurement point on the object at the first time and a first location of a second measurement point on the object at the first time based on the imaging by the first and second cameras at the first time; imaging the object with the first camera at a second time distinct from the first time; imaging the object with the second camera at the second time; determining a location of the first measurement point on the object at the second time and the second measurement point on the object at the second time based on the imaging by the first and second cameras at the second time; and determining a deformation of the object based on the locations of the first and second measurement points at the first and second times.

With such an arrangement, the system may more easily and more accurately measure deformations of an object. While the system may function with a single camera, it may be difficult to detect or measure movement of a measurement point along an optical axis of the camera (also referred to as out-of-plane movement). Determining a location of the measurement points on the object based on the imaging by the first and second cameras can comprise a photogrammetry process or the like.

Further, the system may monitor more than two measurement points at a single time, allowing more in-depth analysis to be performed. Each camera may image at least two, optionally more than two, measurement points on the object. The measurement points may all be captured within a single image taken by each camera.

The measurement points may be features or symbols on the object. The measurement points may be corners, edges or holes in the object. Alternatively, the measurement points may be symbols drawn onto the object, such as circles or crosses. The measurement points may also be referred to as measurement locations. The images taken of the object by the cameras may include the measurement points and the controller may identify the measurement points within the image. In this way the locations of the measurement points may be determined.

Determining the locations of the measurement points may comprise identifying a symbol or feature on the object.

Determining the locations of the measurement points may comprise using a Hough transform. Using a Hough transform may allow the measurement points to be more easily located in the image, in particular where the feature or symbol defining the measurement point may be distorted, such as by being imaged at an oblique angle.

The controller may be arranged to determine a location of one or more holes, edges and/or corners of the object, and the determining of the locations of the measurement points may be based at least partially on the determined location(s) of the one or more holes, edges and/or corners. This may assist the locating of the measurement points and may reduce the prospect of mis-identification of measurement points.

Determining the locations of the measurement points may comprise determining the locations in an object-based coordinate system or in another non-native coordinate system. While a system may use a coordinate system based on the measurement system, for example with the origin at the camera, the use of a different coordinate system may allow simpler calculations of deformation and may therefore allow the system to be used with a lower latency. A non-native coordinate system may also be more useful to a user, requiring less downstream processing for obtaining meaningful results.

The system may further comprise an artificial light source arranged to illuminate the object. The light source may allow an improved image quality. The signal to noise ratio of the image data may also be increased. This may allow the measurement points to be located more precisely by the controller. Further, the light source may improve accuracy of measurement as the exposure time required for the image may be reduced, allowing the location of the measurement points to be determined at a more precise time.

The artificial light source may be arranged to produce monochromatic light and optionally the first and/or second cameras may comprise band pass filters arranged to permit light of the wavelength of the artificial light source. This may allow the image to be taken with reduced interference, such as by radiation produced by the object due to its temperature or other ambient light. This may particularly improve measurement accuracy in the case where there are any changes in the spectrum of ambient light or light radiated by the test specimen, such as due to heating of the specimen. Such changes in light conditions can otherwise lead to measurement inaccuracy due to chromatic aberrations of the lens that result in an apparent movement of the measurement locations in the image and therefore inaccurate measurement data.

The artificial light source may be arranged to produce polarised light. Optionally, the first and/or second camera may comprise polarising filters arranged orthogonal to the polarisation direction of the artificial light source. This may reduce glare from the light source being detected by the camera, as only non-specular reflections of light from the light source may be detected. The reduction in glare may reduce the chance of mis-identification of measurement points by the controller, improving measurement reliability.

The light source may be a strobe light. Optionally, the strobe light may be synchronised with the first and second camera such that the object is illuminated during imaging of the object with the first and second cameras. In this way, a strobe light may be 'over-rated', meaning that a high instantaneous power may be used for the light, providing a high level of illumination and allowing an image to be produced with a short exposure time. This may more precisely allow the time at which the object image is to be determined and may therefore allow a higher deformation measurement accuracy. The overall latency of the device may also be reduced, and this may be particularly beneficial in closed-loop control of the measurement and imagine. Motion blur may also be reduced, increasing measurement accuracy.

The first camera and the second camera may be arranged in a fixed orientation. Put another way, the optical axis of the first and second cameras may be fixed relative to each other such that the position and orientation of the second camera relative to the first camera is known and constant; for example, the cameras may be attached to one another or mounted on a common platform. Alternatively, the second camera may be movable relative to the first camera and the orientation of the second camera relative to the first camera may be measured and may be transmitted to the controller, such as via an encoder.

The first camera and the second camera may each have a focal length and the focal lengths may be the same at the first and second times. This may allow more simple computing of the position of the measurement locations from the images.

The controller may be arranged to attempt to determine the locations of the first and second measurement points at the first time (i.e. in the images obtained at the first time) and, based on a failure of the determination, may be arranged to instruct the first and/or second camera to obtain further images of the object based on the failure. Put another way, if the controller is unable to identify one or more of the measurement points in the images from the first or second camera at the first time, then the controller may instruct the cameras to obtain further images, which may subsequently be analysed in order to determine the locations of the measurement points. The controller may therefore be arranged to determine whether to instruct the first and/or second camera to obtain at least one further image of the object at the first time based on a level of success of the determination of the locations of the measurement points.

The controller may be arranged to attempt to determine the locations of the measuring points in the image from the first camera and the image from the second camera, and to make an individual determination of the level of success for each image.

Based on a failure of the determination of the locations of the measurement points in an image from only one of the first and second cameras at the first time, the controller may be arranged to instruct only the corresponding one of the first and second cameras to obtain at least one further image.

The controller may attempt to determine a location of the measurement points in the further images and, based on a determination of a location for all measurement points in a further image, may cease the instruction to obtain further images. The controller may at this stage begin measurement of the object, such as measurement of a distance between the measurement points. This may allow a more automated system, reducing the burden on a user.

The controller may be arranged to cause the deformation monitoring system to obtain images of the measurement points at further times, subsequent to the second time, until a failure to determine a location of at least one of the measurement locations. This may allow the system to act autonomously to continue measurements until the end of an experiment, such as due to failure of a sample or removal of a sample by a user.

The system may further comprise an accelerometer or magnetometer, and the controller may be arranged to determine an orientation of the first and/or second camera based on an output of the accelerometer or magnetometer. An accelerometer may determine an orientation of the deformation monitoring system relative to horizontal and a magnetometer may determine a bearing of the deformation monitoring system relative to magnetic north. The deformation monitoring system may therefore be used to measure objects in the environment and to compare the deformation to known reference frames.

The deformation monitoring system may further comprise an alignment system arranged to project alignment markings proximate the object. The alignment system may comprise a laser arranged to project an alignment marking proximate the object, i.e. generally toward the object. The alignment markings may denote a limit of a measurement volume of the first and second cameras and/or a centre of the measurement volume. The alignment system may be fixed to the cameras to move with the cameras and so may assist a user in setting up the deformation monitoring system, to ensure measurement points are within the measurement volume and will be in the images obtained by the cameras.

The controller may be arranged to carry out a validation function, the validation function comprising: recognising a validation object; measuring a distance between measurement points on the validation object; and comparing the measured distance to a known value for the distance between the measurement points on the validation object. The controller may be arranged to repeat the measuring and comparing steps of the validation function until a failure to determine a location of at least one of the measurement locations. The validation function may improve accuracy and reliability of results and may do so in an automated way, reducing the burden on a user. The repeated measurement may further improve the validation function by allowing a user to move a validation object freely for a more complete validation process.

The controller may be arranged to record at least one of: the images from the first and second cameras, the locations of the measurement points, and the determined deformation. The recording function may allow the system to be used as a stand-alone system, with data being transferred to a separate system at a later time.

The controller is arranged to identify an identifier from the images from the first and/or second camera. The identified may be unique. The identifier may be on or associated with the object. The identifier may be alphanumeric or a barcode or QR code. Data from the identifier may be obtained and may be recorded with measurement data and/or with the images. This may assist a user in data processing at a later time.

According to a second aspect of the invention, there is provided a method of monitoring deformation of an object, the method comprising: providing an object having a first measurement point and a second measurement point; imaging the first measurement point and the second measurement point with a first camera; imaging the first measurement point and the second measurement point with a second camera; determining the locations of the first and second measurement points based on the imaging by the first and second cameras; deforming the object to produce a deformed object having deformation measurement points; imaging the first deformation measurement point and the second deformation measurement point with the first camera; imaging the first deformation measurement point and the second deformation measurement point with the second camera; determining the locations of the first and second deformation measurement points based on the imaging by the first and second cameras; and determining deformation of the object based on the locations of the first and second measurement points and the locations of the first and second deformation measurement points.

With such a method, there is provided a non-contact scheme for measuring deformation of an object.

The method may further comprise drawing or attaching symbols onto the object denoting the measurement points. This may allow the measurement points to be determined more easily by the controller.

Imaging the first measurement point and the second measurement point with the first camera may consist of taking a single image, and/or imaging the first measurement point and the second measurement point with the second camera may consist taking a single image. Generally, the cameras may be arranged to provide images where each image contains all measurement points. In particular, where there are two cameras, each of the two cameras may be arranged such that each measurement point is visible in each image from the two cameras.

The method can comprise positioning the cameras such that the side of their image sensors with the most pixels is aligned with a long axis of the test object.

The method can comprise positioning one of the cameras such that its optical axis is perpendicular to a plane intersecting the first and second measurement points.

BRIEF DESCRIPTION OF THE DRAWINGS

FIGS. 4*a* to 4*g* show different possible appearances of measurement points;

DETAILED DESCRIPTION

The device of this invention may measure the position, motion and deformation of an object at multiple moments in time. At each moment in time, it measures the position of one or more measurement points on an object. The positions are measured in three-dimensions, in a coordinate system that is local to the device. This coordinate system is referred to as the Native Coordinate System. From the measured position of the measurement points, the device may calculate, at each moment in time, measurement data such as:

- a position of each measurement point;
- a position of a measurement point relative to another measurement point;
- a distance between a pair of measurement points;
- a position and/or a direction of a line passing through two or more measurement points;
- a position and/or an orientation of a plane passing through three or more measurement points;
- a position and/or an orientation of a local coordinate system, where the position of at least three of the measurement locations within that local coordinate system are known. The local coordinate system may be the object's local coordinate system;
- a change in any of the above that occurs from one moment in time to another; and
- a position, a motion and/or a deformation of the object may be readily inferred from one or more of the above.

Figure 1:
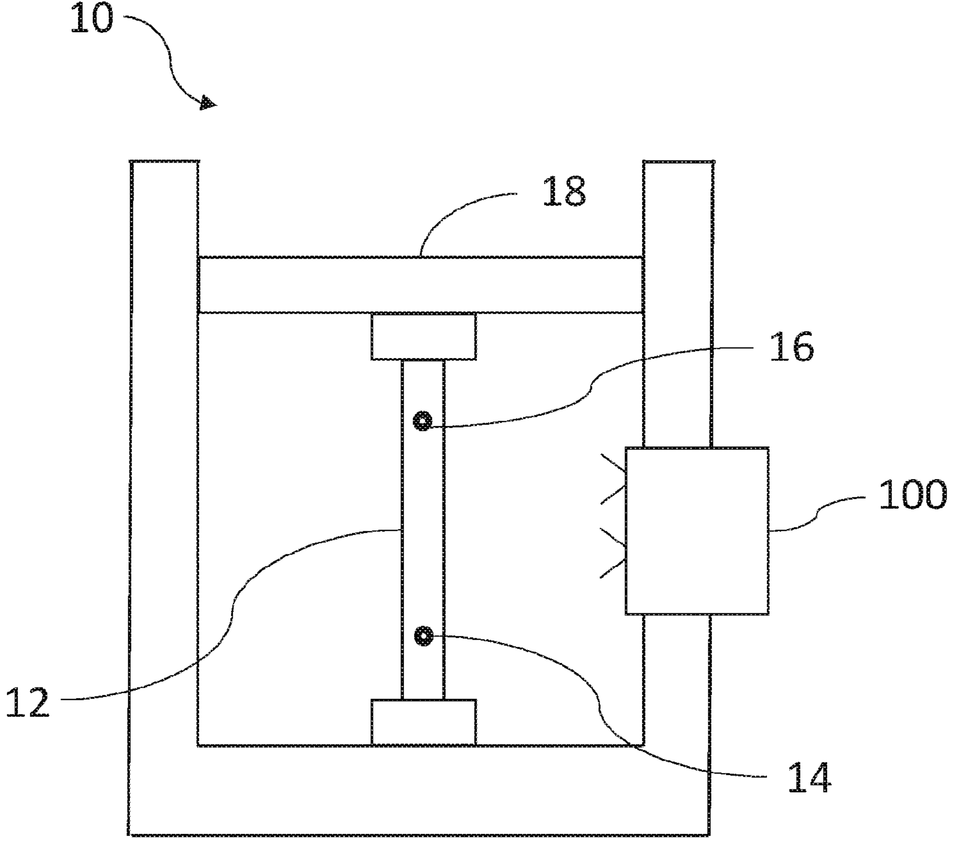
FIG. 1 shows a testing apparatus incorporating a deformation monitoring system according to the invention.

FIG. 1 shows a testing apparatus 10 including a test specimen 12 that is deformable by movement of a crosshead 18, which may exert a compressive or tensile force on the test specimen 12. The test specimen 12 has two measurement points: a first measurement point 14 and a second measurement point 16. While the measurement points 14, 16 are shown as circles drawn onto the surface of the test specimen 12, it will be understood that alternative measurement points, such as edges, corners or holes in the test specimen 12 may be used and that other symbols such as crosses and speckles may be drawn on the surface. In some cases, features of a test specimen 12 such as edges and corners may be used during the determination of the location of measurement points, while not themselves being measurement points. Such features may be referred to as indirect measurement points. A deformation monitoring system 100, which in the arrangement of FIG. 1 may act as an extensometer, is arranged to observe the test specimen 12 as it is deformed by movement of the crosshead 18.

Figures 2A, 2B:
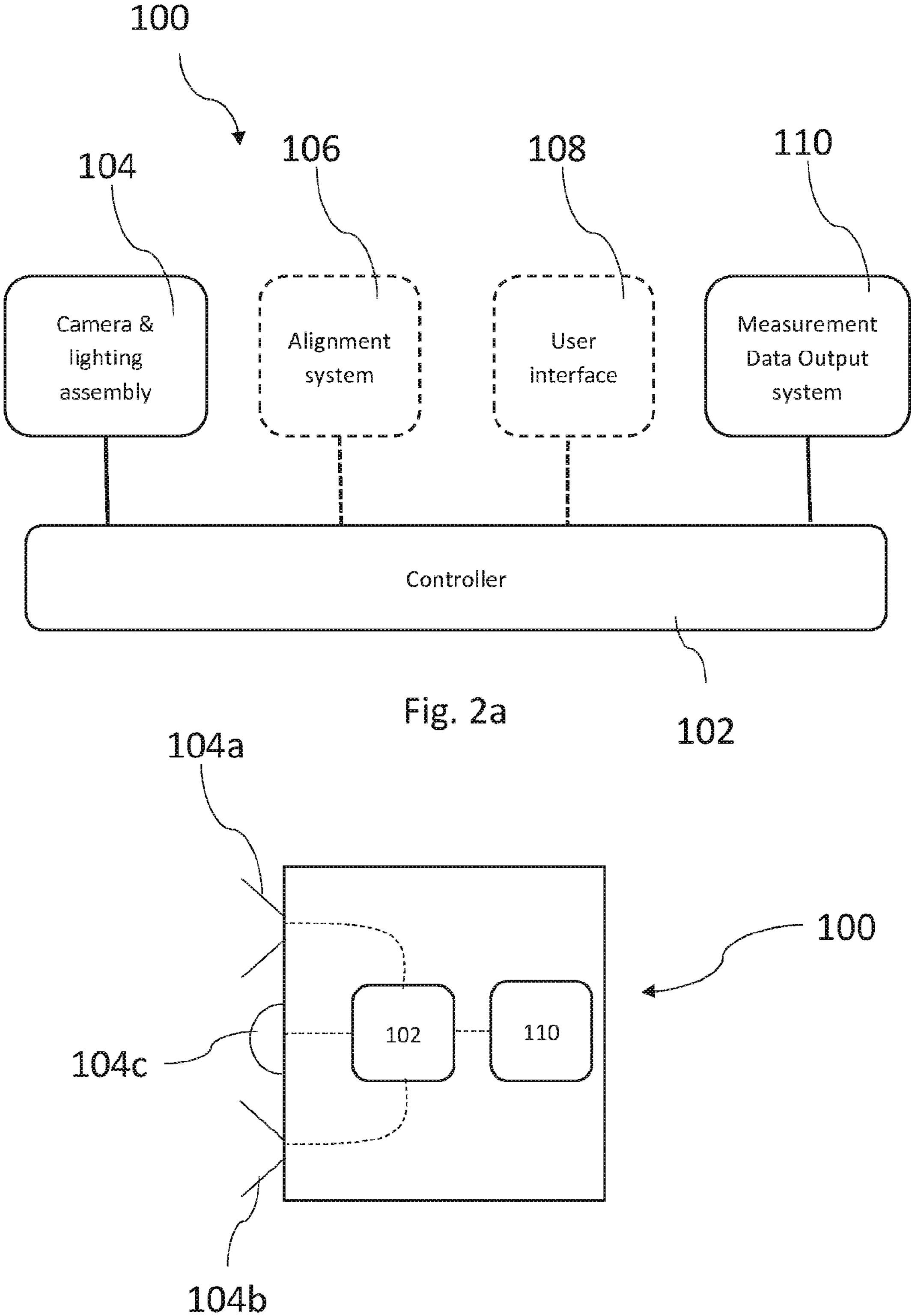
FIGS. 2*a* and 2*b* are schematic diagrams of a deformation monitoring system according to the invention.

FIGS. 2*a* and 2*b* are schematic diagrams showing parts of the deformation monitoring system 100.

A controller 102 is arranged to control the functions of the deformation monitoring system and can take any suitable form such as a general-purpose computer, one or more data processors with appropriate memory and I/O devices and/or an ASIC.

The deformation monitoring system 100 also has at least two cameras 104*a*, 104*b* and may have one or more lights 104*c*. Together, the light(s) and cameras may be referred to as a camera and lighting assembly 104. The term camera as used herein is intended to refer to any image capturing device that produces an image capable of being analysed to find a measurement point. Similarly, the term 'light' is used for any device that may emit electromagnetic radiation in order to improve an image captured by a camera.

One or both of the two cameras may utilise a monochrome sensor with 1440×1080 pixels. The camera(s) may also or alternatively be arranged to output a strobe output signal that is active during exposure of the image and to receive a trigger input signal that can be used to trigger the sensor to capture an image. The strobe output signal may be used to actuate a strobe light in order to synchronise the camera exposure with the light activation. A suitable an image sensor is a Sony IMX 273 sensor that is able to capture full frames at 276 Hz. The sensor might be coupled with an 8 mm focal length lens, 470 nm bandpass filter and/or a polarising filter. Image sensors with higher pixel resolutions may be used to increase measurement resolution of the device. Image sensors able to capture at higher frame rates may be used to achieve a higher measurement data rate. Lenses with different focal lengths may be used to achieve different sizes, shapes or positions of the measurement volume.

Further, the cameras may be coupled such that strobe output of one camera may be received as the trigger input signal of the other camera(s), such that all cameras may synchronously capture images at the same moment in time.

The light 104*c* are arranged to illuminate measurement points on a test specimen such as that shown in FIG. 1. The cameras 104*a*, 104*b* are positioned to view measurement points on the test specimen.

The light 104*c* may have an array of 32 LEDs emitting light that is predominantly blue in colour. Suitable LEDs are Cree XP-E2 Blue LEDs. Each LED may be coupled with a lens so as to produce a beam angle that evenly illuminates the measurement volume of the device. The LEDs may be coupled with a polariser element such that the emitted light is predominantly polarised at a single orientation. The LEDs may be split into two or more banks, such as two banks of 16, such that the intensities of the banks may be different, so as to achieve even illumination of all aspects of the test specimen.

Where the light may be a strobe light and maybe synchronised with the cameras, the strobe outputs of the cameras may be combined via a logic 'or' function such that the light may be active whenever either camera is obtaining an image. The strobe signal may be connected such that the LEDs are only on if the combined strobe signal is active. This may have the effect of synchronising the strobing of the lights to the exposure periods of the cameras. The cameras may be operated at a capture rate of more than 80 Hz so as to avoid visible flashing of the lights that might otherwise be detrimental to someone with a photosensitivity to flashing lights.

The cameras 104*a*, 104*b* are mounted such that they are held in fixed registration to each other via a mounting bracket or the like so that their extrinsic calibration parameters do not change after a calibration process has been performed. The focal length and focal distance of the camera lenses are fixed prior to performing the calibration procedure such that the intrinsic camera parameters do not change after the calibration process has been performed. In other embodiments, the cameras can simply have known orientations and/or positions.

The cameras 104*a*, 104*b* each have a field of view, which is a frustum extending from the lens of the camera. Where the two frusta overlap, measurements may be made using both cameras. The overlapping volume may be referred to as a measurement volume.

Some or all of the components of the system can be mounted on or in a common housing which can also include a power source such as a battery or wired electrical input connector.

Each camera captures a sequence of two or more images that are sent to the controller. Image capture may be synchronised across all cameras such all cameras capture images at the same moments in time. This can ensure that three-dimensional measurements made from the images are not adversely affected by any movement of the test specimen relative to the cameras.

In order to keep the device's measurement latency as low as possible, each image may be made available to the controller as soon as possible after it has been captured. If this requires the image data to be transferred, for example over a bus, then that bus should be of high bandwidth and low latency. In one example, the high-bandwidth bus may be a MIPI-CSI bus with one or more lanes operating at over 1 Gbit/s.

Digital cameras contain an image sensor that consist of a 2-dimensional, rectangular array of pixels where that array typically has more pixels along one side than along the other. As test specimens are typically long & thin, it is advantageous to position the cameras such that the side of the image sensor with the most pixels is aligned with the long axis of the test specimen. This maximises the number of pixels along the length the specimen which help to maximise the measurement resolution of the device.

If the measurement locations are contained approximately within a plane (including along a line), or within multiple parallel planes, then it may be advantageous to position one of the cameras such that its optical axis is perpendicular to that plane. This may make it easier to automatically detect the measurement locations in images captured from that camera. Images captured from that camera may also be more easily interpreted by an operator.

The cameras may be fitted with optical band-pass filters such that the light detected by the image sensor within each camera is essentially monochromatic. Without such filters, any changes to the wavelengths of light illuminating the specimen may, due to chromatic aberrations of the lens, result in an apparent movement of the measurement locations and therefore inaccurate measurement data. Such changes in the wavelengths of light illuminating the test specimen typically occur if there are changes to the ambient lighting (e.g. artificial lighting is turned on/off, curtains/blinds are opened/closed, a cloud passes in front of the Sun, etc.) or if the temperature of the test specimen changes such that the amount and/or wavelength of light emitted by the test specimen changes.

The lights may be arranged to produce essentially monochromatic light. This may be used instead of, or in conjunction with fitting optical band-pass filters to the cameras to reduce the impact of chromatic aberrations of the camera lenses. If used in conjunction with optical band-pass filters, then the nominal wavelength of the monochromatic light may be matched to the nominal band-pass wavelength of the optical filters.

The lights may be arranged to produce light that is polarised, and the cameras may be fitted with polarising filters. In this case, the polarising filters are aligned such that they pass light that is polarised in a direction that is essentially orthogonal to the direction of polarisation of the lights. This reduces glare in the images caused by specular reflections of the lights from shiny test specimens, windows, transparent safety screens, etc. Such glare can otherwise interfere with the appearance of measurement locations within the images and therefore adversely affect the accuracy of measurement data.

The lights may be strobed such that they are on while any camera is exposing an image but may be off if no camera is exposing an image. The proportion of time that the light is on, also known as the 'duty cycle', may therefore be less than 100%. A duty cycle less than 100% reduces the power consumption of the device and/or allows the lights to be over-driven (operated at intensities greater than their nominal rating). Over-driving the lights allows the exposure time of the cameras to be reduced which reduces the measurement latency of the device and reduces measurement inaccuracy that may otherwise be caused by motion blur.

In the illustrated embodiment the Controller 102 is arranged to perform the following functions:

A Camera & Light Control and Image Capture function
An Automatic Operation function
An Orientation Detection function.
A Measurement Location Detection function
A Measurement function
A Recording function
A Validation function
A Specimen Label Reading function It will be understood that the controller 102 may have any one or more of these functions in appropriate combinations. For example, the controller may have the functions of controlling the camera and light, automatic operation, orientation detection, measurement location detection and measurement. However, any of the other three functions may also be carried out by the controller or any of the first five functions may be omitted from the controller.

To perform these functions, the controller 102 may comprise a processor, electronic storage and input and output connections. Each of the Controller's functions is described in detail in the following sections.

The Camera & Light Control and Image Capture function of the controller configures each camera to capture a sequence of two or more images. Captured images are grouped into image sets, where each image set contains one image from each of at least two cameras. If the Camera and Lighting Assembly has more than two cameras, then ideally the image set contains one image from each of the cameras. In this way, the sequences of images captured by the cameras becomes a sequence of image sets. If image capture is synchronised across all cameras, then all images in an image set will have been captured at the same moment in time.

As images are captured and grouped into image sets, the image sets are then passed on to other elements of the Controller (e.g. those parts performing a measurement function). In order to keep the device's measurement latency as low as possible, each image set is sent to other parts of the controller as soon as possible after the images have been received from the cameras.

The Camera & Light Control and Image Capture function of the Controller also configures the cameras & lights with appropriate settings including, but not limited to, camera exposure time, camera image gain, camera frame rate and light intensity. Camera and light settings that affect image exposure (e.g. camera exposure time, camera image gain and light intensity) may be varied automatically such that optimal image exposure is achieved even if the appearance of the measurement locations changes either over time or from one test specimen to another. Image exposure is optimal when the areas of images that correspond to measurement locations are exposed such that contrast is maximised but without any over-exposed pixels (i.e. no pixels in the areas have an intensity value that corresponds to the maximum possible intensity value of a pixel). Achieving optimal image exposure increases the signal to noise ratio of the image and therefore helps to maximise the accuracy and resolution of the measurement data.

The Automatic Operation function of the controller may automatically control all components of the device such that it does not require any interaction from an operator to perform measurement on a batch of one or more test specimens. In summary, it automatically determines when a test specimen is placed within the measurement volume of the device by automatically identifying measurement locations on the test specimen. It then determines when to start measuring the position of those measurement locations and continues measuring them until the device automatically determines that testing of the test specimen is complete, at which point it stops the measurement process and prepares to detect the next test specimen.

Figure 5:
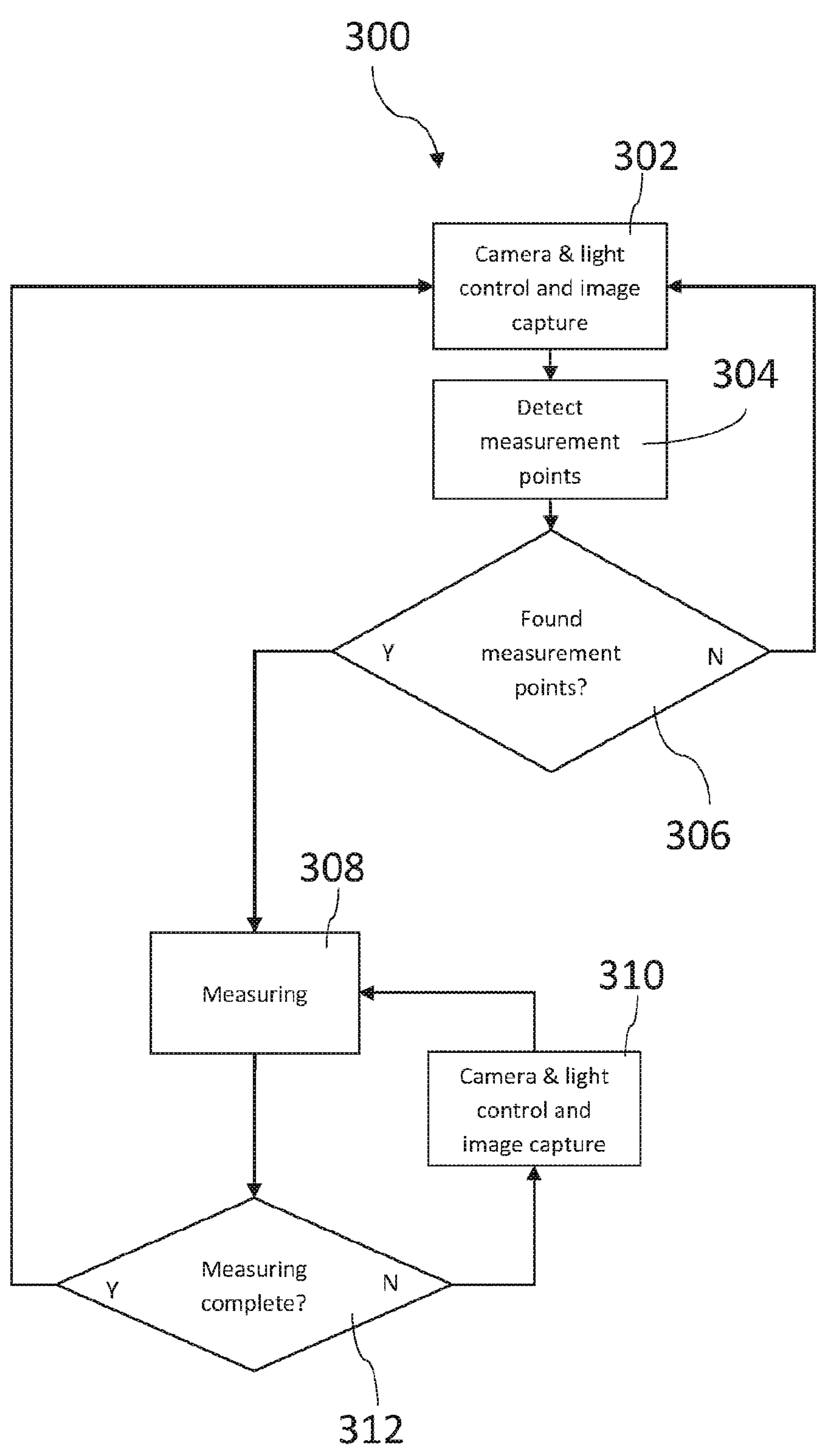
FIG. 5 is a flow chart describing a method of monitoring deformation according to the invention.

The Automatic Operation function may be controlled as shown in flowchart 300 in FIG. 5. At step 302 an initial state performs the Camera & Light Control and Image Capture function. After receiving a set of captured images, the automatic operation function utilises the Measurement Location Detection function at step 304 to detect measurement locations (within the measurement volume of the device) that are visible within the captured images. Whether the measurement locations are successfully detected will be determined at step 306, and based on the determination, the controller may advance to a Measuring state at step 308, otherwise it will capture the next available set of images and try to detect the measurement locations again. In some cases, the controller may determine whether the measurement points are stationary, and may obtain further images until the measurement points are deemed to be stationary. The controller may move to the measuring state at step 308 based on a determination that the measurement points are stationary in the images obtained at step 302.

Once in the measuring state 308, the controller will perform a Measurement function repeatedly on one image set after another at steps 308 and 310, until it automatically determines that the measurement process is complete at step 312. The measurement process may be deemed complete using criteria such as, but not limited to, those below:

Measurement locations are no longer within the measurement volume;

The 3D position of Measurement locations can no longer be measured. This may occur if, for example, a measurement location is not visible to two or more cameras; or.

The test specimen has ceased deforming.

When the measurement process is deemed complete, it returns to the initial state 302 that performs Camera & Light Control and Image Capture.

The Orientation Detection function determines a transform that can be used within the Measurement function of the Controller to transform measurement data from a Native Coordinate System to a Measurement Coordinate System. The Native Coordinate System may be centred on the device and may be the coordinate system in which locations of measurement points are initially determined. The Measurement Coordinate System may be a coordinate system that is of greater relevance to a user, such as a coordinate system aligned with features of a measurement specimen and/or with North and/or with a vertical axis.

The transform may be the identity transform, in which case the Measurement Coordinate System is the same as the Native Coordinate System. Alternatively, one or more sensors may be used to detect the orientation of the device with respect to external references such vertical, horizontal or magnetic north. Such sensors might include one or more accelerometers or magnetometers. Given the detected orientation of the device, a transform is readily determined that transforms measurement data form the Native Coordinate System into a Measurement Coordinate System that is defined with respect to one or more external references such as: horizontal, vertical or magnetic north.

The Measurement Location Detection function of the Controller is arranged to automatically find all measurement locations that are visible in the images of an image set. For each measurement locations that is found, its position is ascertained in every image that it is visible in. A position in an image may be represented as a coordinate into the camera's two-dimensional image sensor array.

If the measurement locations have known appearance, or if marks with a known appearance have been applied to the measurement locations, then they can be found, and their image position ascertained, via techniques that are well-known to those skilled in the field of image processing such as, edge detection, template matching, the Generalised Hough Transform, the Harris corner detector, etc. For example, if the measurement locations appear as a circular shape, then a Hough Transform can be used to find the circles and ascertain the image coordinate of the centre of each circle. Such techniques can be used to easily find measurement locations with a variety of appearances including, but not limited to, circular spots, circular rings, lines, crosshairs, bullseyes, chequer, and 'speckle' patterns.

Alternatively or additionally, if there are identifiable features on the test specimen apart from drawn measurement points, and the position of the measurement locations relative to those identifiable features is known, then the measurement locations can be found by first finding the other identifiable features and then inferring the position of the measurement locations from the position of the identifiable features. Examples of such identifiable features include edges, corners, holes, etc. Such identifiable features can readily be found using techniques such as the Canny edge detector, the Harris Corner detector, Generalised Hough transform, etc., that are well-known to those skilled in the field of image processing.

Figure 3A:
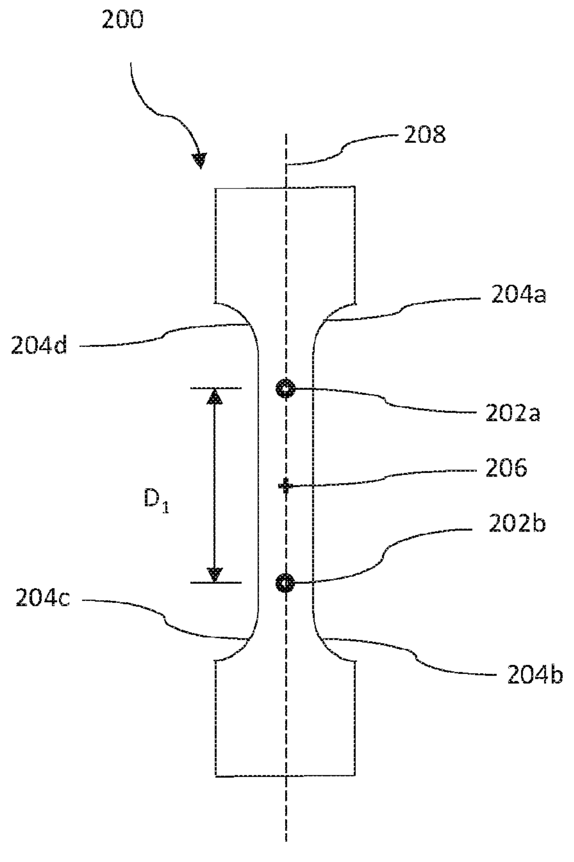
FIG. 3*a* shows a test specimen for use with deformation monitoring systems according to the invention.

FIG. 3*a* illustrates a test specimen 200 where the measurement points 202*a*, 202*b* are known to be a distance $D_1$ apart and lie along a centre-line 208, equidistant from a centre-point 206. The centre-line 208 and centre-point 206 may be easily calculated from the detected positions of the corner features 204*a-d* on the specimen such that the locations of the measurement points 202*a*, 202*b* may be inferred from the detected positions of the corner features 204*a-d*.

In some test scenarios, it may be advantageous to check whether the measurement points have been stationary for a pre-determined amount of time before considering them to have been successfully found. For example, this avoids the device undesirably entering a Measuring state whilst the test specimen is still being loaded into the UTM prior to testing.

Figure 4G:
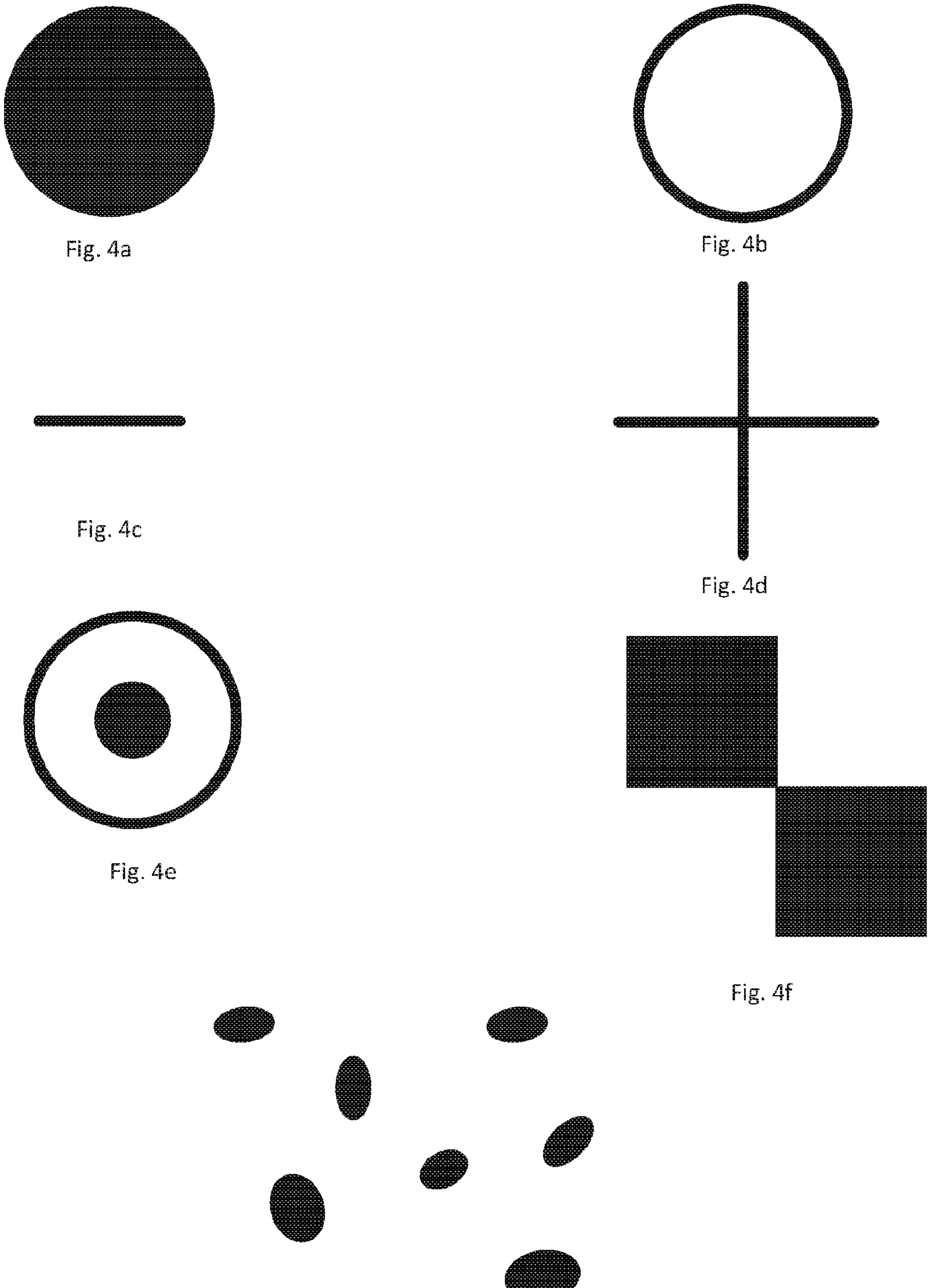

A range of different shapes and symbols may be applied to the test specimen in order to denote the measurement point. Such examples are shown in FIGS. 4*a* to 4*g*. FIG. 4*a* shows a solid circle, FIG. 4*b* shows a hollow circle or a ring, FIG. 4*c* shows a dash, FIG. 4*d* shows a cross, FIG. 4*e* shows a ring with a solid circle inside it, FIG. 4*f* shows two touching squares touching diagonally at corners, also called a checker, and FIG. 4*g* shows a speckle pattern. Any of these shapes may be used to denote measurement locations.

The Measurement function of the controller receives a sequence of image sets, and for each image set it generates measurement data such as that previously described. Other measurement data may be generated in addition to or instead of any of the previously mentioned measurement data. Such other measurement data might include one or more of:

- Axial Strain between two measurement locations positioned along the longitudinal axis of the test specimen.
- Transverse Strain between two measurement locations positioned across the transverse axis of the test specimen.
- Strain along an arbitrary direction, such as 45 degrees from the longitudinal axis.
- Displacement of the test specimen.
- Rotation of the test specimen (about any axis)
- Bending of the specimen
- Distance between two measurement locations
- Displacement of one or more measurement locations The following steps outline one method for generating measurement data:

1) Ascertaining at least one three-dimensional position (in the native coordinate system) of each measurement location at the moment in time corresponding to the time when the images within the image set were captured.
2) Calculating the measurement data from the ascertained three-dimensional position(s) of measurement location, such as by comparing the relative positions of the measurement location(s) at different times.
3) Using a transform determined by the Orientation Detection function to transform the measurement data into the Measurement Coordinate System.
4) Outputting the Measurement Data via the Measurement Data Output system
5) If the Controller includes a recording function, then the image set and the measurement data may be passed on to the part of the controller that provides the recording function The Recording function comprises a storage element, such as a disk drive, onto which various types of data are recorded. The recorded data may include one or more of the following:

- A sequence of one or more images from one of more of the cameras;
- A sequence of one or more image sets; and.
- A sequence of one or more measurement data values.

The storage device may be volatile or non-volatile.

The Validation function of the controller enables an operator to confirm that the device is measuring accurately. To use this function, the operator positions a Validation Object, such as the one shown in FIG. 3*b*, within the measurement volume of the device. The Validation Object 250 has two or more Validation Marks 252*a*, 252*b* that are at known positions relative to each other. For example, the Validation Object 250 has two validation marks at a known distance $D_2$ apart of 100.000 mm.

The Validation element of the Controller measures the distance $D_2$ between the two validation marks 252*a*, 252*b*. The measured distance $D_2$ is then compared to the known distance between the validation marks in order to calculate an error value. To ascertain whether the device is measuring accurately, the error value is compared with a pre-defined range of acceptable error values. If the error is within the acceptable range, then the device is deemed to be measuring accurately.

In one method, the Controller receives a sequence of image sets, and for each image set it performs the following steps:

1) Detecting the location of the validation marks. This may be achieved using a Validation Object Detection function that is essentially the same as the Measurement Location Detection function of the Controller.
2) Ascertaining the three-dimensional position of each validation mark. This may be achieved using a Validation function that is essentially the same as the Measurement function of the Controller.
3) Comparing the measured relative positions of the validation marks with the known relative positions to calculate an error value. For example, if the validation marks are known to be 100.00 mm apart and they are measured to be 100.010 mm apart, then the error is calculated to be 0.010 mm. The error value may also be expressed as a relative error by dividing by the known distance. The relative error may be expressed as a percentage. In this example, an error of 0.010 mm may be represented as a relative error of 0.01%
4) The error value is compared to a pre-defined range, such as +/−0.1 mm or +/−0.1% relative error. If the error value is within the acceptable range, then the device is deemed to be operating accurately.
5) Whether or not the device is operating accurately is reported to the operator. The error value and/or relative error may also be reported to the operator The system may function with a great degree of autonomy, utilising the control scheme shown in FIG. 6, described in more detail below. Once in the validating state, it will perform a Validation function repeatedly on one image set after another, until it automatically determines that the Validation process is complete. The Validation process may be deemed complete using criteria such as, but not limited to, those below:

Validation marks are no longer within the measurement volume

The 3D position of Validation marks can no longer be measured. This may occur if, for example, a measurement location is not visible to two or more cameras When the Validation process is deemed complete, it returns to the initial state that performs Camera & Light Control and Image Capture.

The controller may also have a Specimen Label Reading function. The Specimen Label reading function may automatically read information that is encoded in a label that is associated with the test specimen. The label may consist of a hand-written or machine-printed alpha-numeric sequence or other code, such as a barcode or QR code, that encodes information associated with the test being performed, such as a unique serial, batch or test identifier. The label may be attached to the test specimen or elsewhere within the frustum of at least one of the cameras.

Any information that is read from the Specimen Label may be added into the Measurement Data.

In one embodiment, the label is read using readily available methods and tools for Optical Character recognition (OCR), barcode reading or QR code reading.

The deformation monitoring system 100 also has a measurement data output system 110. This provides an interface for sending the measurement data to one or more external systems. Measurement data may also include information that has been read from a Specimen Label. Measurement data may be sent in the form of an analogue signal or a stream of digital data. The interface may consist of more than one channel, such that multiple measurement data values may be sent concurrently. The interface may utilise a wired or a wireless connection.

The deformation monitoring system 100 may have an alignment system 106 that assists the operator to position the test specimen and/or the device such that the measurement points are within the measurement volume of the device. This may be achieved by making aspects of the measurement volume visible to the operator, where such aspects may include:

extents of the measurement volume, such as a top, bottom or corner of the measurement volume a point or line within the measurement volume, such as a centre-point or centre-line In one embodiment, such aspects are made visible to the operator by projecting marks, such as dots or lines, that are visible to the operator and are aligned with one or more aspects of the measurement volume. Such marks may be projected via laser line or laser dot projectors.

The deformation monitoring system 100 may have a user interface 108 including buttons, controls, voice recognition, gesture recognition, indicators, display screens, touch screens, audio, speech output, etc. These elements interact with the Controller in order to allow an operator to perform one or more of the following:

monitor the status of the device, e.g. on/off, measuring/not measuring, etc.

check whether or not the device is measuring accurately.

monitor measurement data values.

configure or control aspects of the device

One or more elements of the user-interface may be provided remotely by a separate device such as a computer, tablet or smartphone. In this case, the device may provide an interface that allows a connection between the Controller and the remote elements of the user-interface. The interface may be wired or wireless, such as Wi-Fi, Ethernet, Bluetooth or a cellular or satellite data connection.

Figure 6:
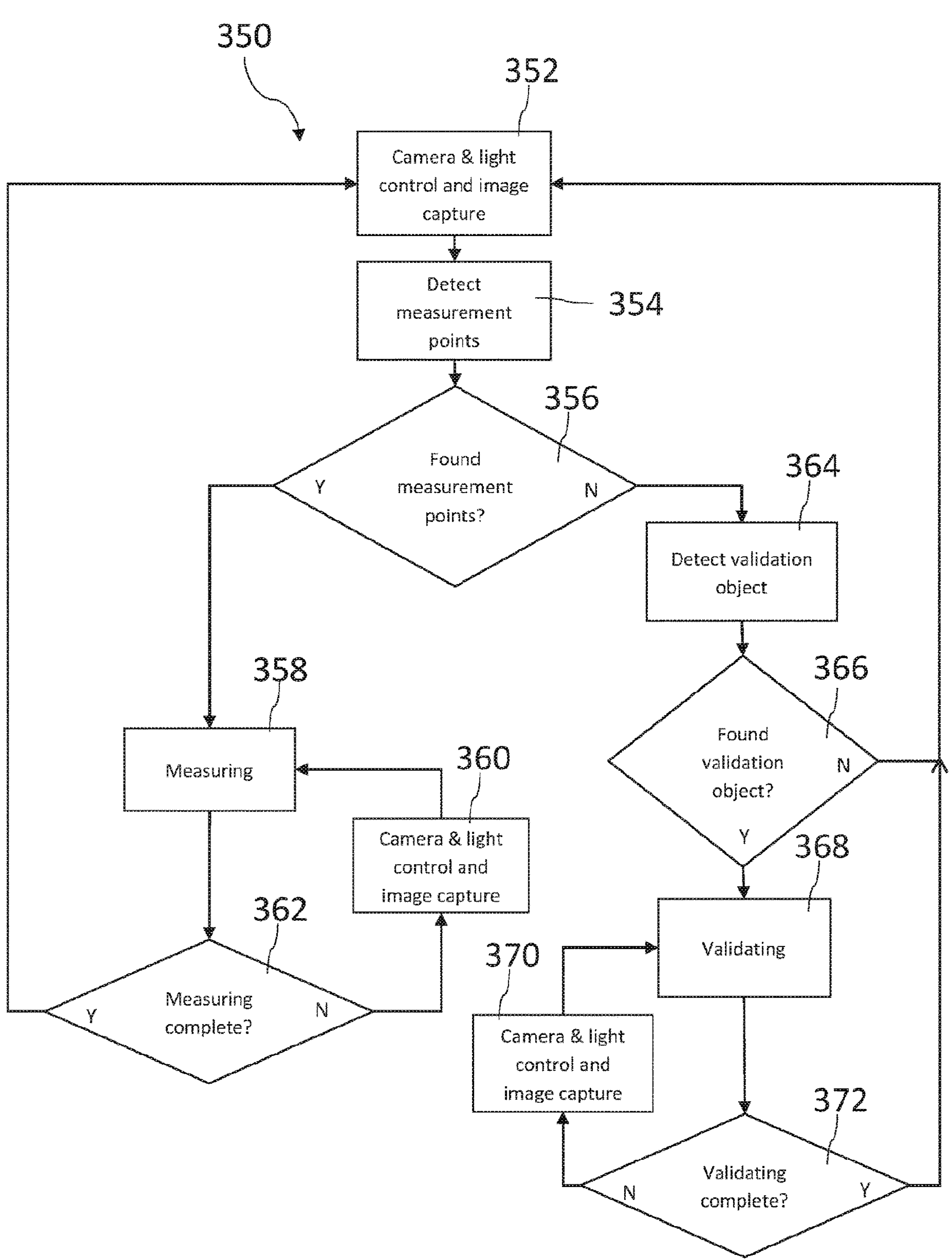
FIG. 6 is a flow chart showing an alternative method of monitoring deformation according to the invention.

FIG. 6 shows a control method 350 for providing an automated function to the deformation monitoring system 100. The system may begin by operating the camera and light apparatus at step 352 to obtain images. The controller then detects the measurement points 354 in the images. At step 356 it is determined whether the measurement points have been found by the controller. If the measurement points have been identified, then the controller may begin measuring parameters such as the distance between the measurement points at step 358. The system may then take images repeatedly, and measure properties of the image, at steps 360 and 358 until measurements are determined to be complete at step 362.

Figure 3B:
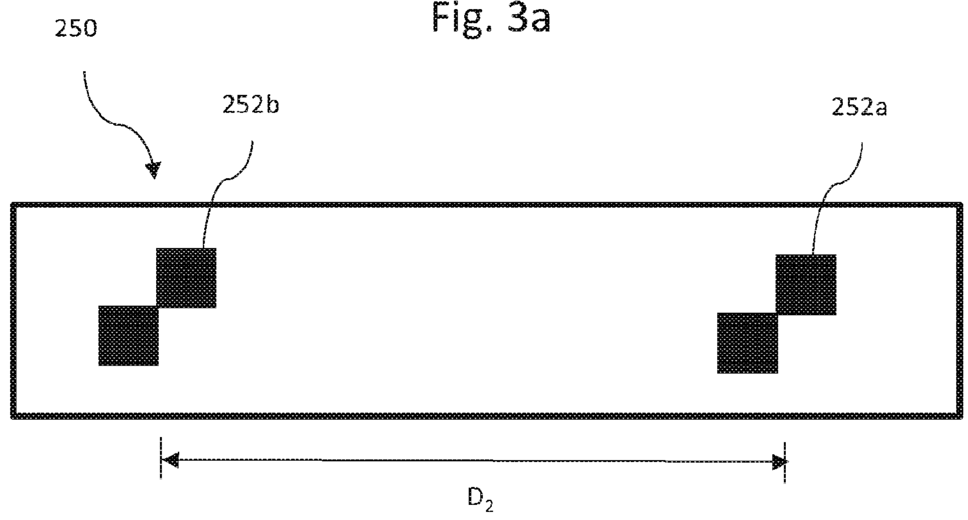
FIG. 3*b* shows a validation object for use with deformation monitoring systems according to the invention.

If the system is unable to detect measurement points at step 354, then the system may enter a validation routine and may attempt to detect a validation object, such as the object 250 shown in FIG. 3*b*, at step 364. If the system determines that a validation object is within the captured image, then a decision will be made at step 366 to begin a validation function of the controller, which is explained above. The validation function is carried out at step 368 and may involve multiple images being taken using the camera and light system at step 370. Once the validation is complete, as may be determined at step 372, the system may return to an initial step and may be ready to receive a specimen for testing.

A deformation monitoring system according to embodiments of the invention is therefore provided with functionality which can solve one or more, and in some embodiments all of the following technical problems:

Inaccurate Measurement Data

- If the object is shiny (e.g. metal), then reflections can be picked up by the camera and interfere with the measurement
- If the object is hot (e.g. part of a jet engine) it may glow red, yellow or even white-hot. This glow can interfere with the measurement
- If the object is behind a window (such as a safety screen), the camera may pick up reflections on the window that interfere with the measurement
- Out-of-plane movement (movement of the object towards or away from the device) can lead to inaccurate measurement data. For example, consider a device employing a single camera. If the object moves closer to the camera it will appear larger in the image (due to perspective). However, if the object remained at the same distance from the camera but was heated up such that it expanded (due to thermal expansion), it would also appear larger in the image. Such a device is unable to determine whether the object has actually deformed or whether it has moved towards/away from the camera. So, the device is unable to measure the deformation accurately if there is movement towards or away from the camera.
- It is not possible to easily check whether the device is measuring accurately.

Complex and Slow to Use

- Very specific marks (such as circular spot marks) must be applied to the object at the desired measurement locations. These marks define the measurement locations and are designed to be easily detectible in the camera images. Applying these marks can be a fiddly process that takes time.
- User input is required to configure & operate the device, e.g. manual selection of measurement locations, manually starting & stopping the measurement function, etc. This may require an interactive user interface (e.g. a GUI on a touch-screen) which increases complexity. In the case of batch testing (i.e. sequential testing of multiple objects), the requirement for interaction by the operator can considerably increase the time to test each object.
- providing a device which need not be positioned at a precise distance (the 'operating distance') from or precisely aligned with the point(s) on the object being measured.
- In most test scenarios, it is advantageous for the measurements to be in a coordinate system such as a coordinate system that is local to the object being measured. However, many devices measure in a coordinate system that is local to the device. Further steps would have to be taken to transform the measurement data into the desired coordinate system. These steps add complexity and consume time, making the device complex and slow to use.
- When testing multiple objects (e.g. batch testing), records must be kept that describe which set of measurement data relates to which object. This is often achieved by labelling the object with a unique number or code. That label must then be entered into the system that is capturing the measurement data. This task is often performed by the operator reading the label and then manually entering it via the user interface of the device. This process is time consuming and prone to error.

Not Suitable for Use in Closed-Loop Control

- Some test scenarios require the device to form part of a closed-loop control system such that the loading force applied by the test rig is automatically varied according to the currently measured deformation. For the control loop to operate successfully, the measurement data generated by the device must be of a sufficiently high data rate and the measurement latency must be sufficiently low and sufficiently constant. Some devices are not able to generate measurement data with sufficient data rates or acceptable latency and are therefore not suitable for use in closed-loop control systems In some cases, the cameras may obtain images of only one measurement point. In this case, a deformation may be measured using a known reference, such as a fixed point, to which a test specimen may be anchored.

Further, deformation measurement systems may have more than two cameras. A greater number of cameras may improve reliability of a system as well as allowing a larger measurement volume and allowing a greater range of data to be obtained.

Deformation measurement systems having more than two cameras or arranged to operate with only one measurement point may have substantially similar features to the deformation measurement systems described previously.

Further specific examples of this disclosure are set out in the following clauses:

A. A method of determining deformation of an object, the method comprising:
  - providing an object having a first measurement point and a second measurement point;
  - imaging the first measurement point and the second measurement point with a first camera;
  - imaging the first measurement point and the second measurement point with a second camera;
  - determining the locations of the first and second measurement points based on the imaging by the first and second cameras;
  - deforming the object to produce a deformed object having deformation measurement points;
  - imaging the first deformation measurement point and the second deformation measurement point with the first camera;
  - imaging the first deformation measurement point and the second deformation measurement point with the second camera;
  - determining the locations of the first and second deformation measurement points based on the imaging by the first and second cameras; and
  - determining deformation of the object based on the locations of the first and second measurement points and the locations of the first and second deformation measurement points.

B. The method of clause A, wherein the measurement points are symbols drawn onto the object.

C. The method of clause A, wherein the measurement points are holes, edges or corners of the measurement object.

D. The method of clause B, wherein the determining of the locations of the measurement points comprises determining a location of one or more holes, edges and/or corners of the object.

E. The method of any preceding clause, wherein determining the locations of the first and second measurement points and/or first and second deformation measurement points comprises using a Hough transform.

F. The method of any preceding clause, wherein determining the locations of the first and second measurement points and/or first and second deformation measurement points comprises determining the locations in an object-based coordinate system.

G. The method of any preceding clause, further comprising illuminating the object with an artificial light source.

H. The method of clause G, wherein the artificial light source produces monochromatic light.

I. The method of clause H, wherein the first and/or second cameras comprise band pass filters arranged to permit light of the wavelength of the artificial light source.

J. The method of clause G, H or I, wherein the artificial light source produces polarised light.

K. The method of clause J, wherein the first and/or second camera comprise polarising filters arranged orthogonal to the polarisation direction of the artificial light source.

L. The method of any of clauses G to K, wherein the light source is a strobe light.

M. The method of clause L, wherein the strobe light is synchronised with the first and the second camera such that the object is illuminated.

N. The method of any preceding clause, wherein imaging the first measurement point and the second measurement point with the first camera consists taking a single image; and/or wherein imaging the first measurement point and the second measurement point with the second camera consists taking a single image; and/or wherein imaging the first deformation measurement point and the second deformation measurement point with the first camera consists taking a single image; and/or wherein imaging the first deformation measurement point and the second deformation measurement point with the second camera consists taking a single image.

O. The method of any preceding clause, wherein the first camera and the second camera are maintained in a fixed orientation.

P. The method of any preceding clause, wherein the first camera and the second camera each have a focal length and the focal lengths are the same when imaging the measurement points and the deformation measurement points.

Q. The method of any preceding clause, wherein the first camera and the second camera are synchronised such that the imaging of the first measurement point and the second measurement point with the first camera and the imaging of the first measurement point and the second measurement point with the second camera are simultaneous; and/or wherein the first camera and the second camera are synchronised such that the imaging of the first deformation measurement point and the second deformation measurement point with the first camera and the imaging of the first deformation measurement point and the second deformation measurement point with the second camera are simultaneous.

R. The method of any preceding clause, wherein a controller attempts to determine the locations of the first and second measurement points and, based on a level of success of the determination, instructs the first and/or second camera to obtain further images of the first and second measurement points.

S. The method of any preceding clause, further comprising determining an orientation of the first and/or second camera based on an output of an accelerometer or magnetometer.

T. A deformation monitoring system comprising:

a first image capturing device arranged to capture a first image of an object;

a second image capturing device arranged to capture a second image of the object, the second image capturing device being in a known orientation relative to the first image capturing device; and a controller arranged to cause the deformation monitoring system to carry out the method of any one of clauses A to S.

The invention claimed is:

1. A deformation monitoring system for measuring deformation of an object, the system comprising: a first camera arranged to capture a first image of an object; a second camera arranged to capture a second image of the object, the second camera being in a fixed orientation relative to the first camera; and a controller arranged to cause the deformation monitoring system to carry out the steps of: imaging the object with the first camera at a first time; imaging the object with the second camera at the first time; determining a first location of a first measurement point on the object at the first time and a first location of a second measurement point on the object at the first time based on the imaging by the first and second cameras at the first time; imaging the object with the first camera at a second time; imaging the object with the second camera at the second time; determining a location of the first measurement point on the object at the second time and the second measurement point on the object at the second time based on the imaging by the first and second cameras at the second time; and determining a deformation of the object based on the locations of the first and second measurement points at the first and second times, wherein the controller is arranged to attempt to determine the locations of the first and second measurement points at the first time and to determine whether to instruct the first and/or second camera to obtain at least one further image of the object based on a level of success of the determination of the locations of the first and second measurement points.

2. The deformation monitoring system of claim 1, wherein determining the locations of the first and second measurement points comprises identifying a symbol or a feature on the object.

3. The deformation monitoring system of claim 2, wherein the controller is arranged to determine a location of one or more holes, edges and/or corners of the object, and wherein the determining of the locations of the first and second measurement points is based at least partially on the determined location(s) of the one or more holes, edges and/or corners.

4. The deformation monitoring system of claim 1, further comprising an artificial light source arranged to illuminate the object.

5. The deformation monitoring system of claim 4, wherein the artificial light source is arranged to produce monochromatic light.

6. The deformation monitoring system of claim 5, wherein the first and/or second cameras comprise band pass filters arranged to permit light of the wavelength of the artificial light source.

7. The deformation monitoring system of claim 4, wherein the artificial light source is arranged to produce polarised light.

8. The deformation monitoring system of claim 7, wherein the first and/or second camera comprises polarising filters arranged orthogonal to the polarisation direction of the artificial light source.

9. The deformation monitoring system of claim 4, wherein the light source is a strobe light.

10. The deformation monitoring system of claim 9, wherein the strobe light is synchronised with the first and the second camera such that the object is illuminated during imaging of the object with the first and second cameras.

11. The deformation monitoring system of claim 1, wherein the first camera and the second camera each have a focal length and the controller is arranged such that focal lengths are the same at the first and second times.

12. The deformation monitoring system of claim 1, wherein based on a failure of the determination of the locations of the first and second measurement points at the first time, the controller is arranged to instruct the first and/or second camera to obtain further images of the object before determining the locations of the first and second measurement points.

13. The deformation monitoring system of claim 1, wherein the controller is arranged to attempt determine the locations of the first and second measurement points in the image from the first camera and the image from the second camera at the first time, and to make an individual determination of the level of success for each image, wherein, based on a failure of the determination of the locations of the first and second measurement points in an image from only one of the first and second cameras at the first time, the controller is arranged to instruct only the corresponding one of the first and second cameras to obtain at least one further image before determining the locations of the first and second measurement points.

14. The deformation monitoring system of claim 1, wherein based on a success of the determination of the locations of the first and second measurement points at the first time, the controller is arranged to cease instructing the first and/or second camera to obtain further images of the object and to begin determining the locations of the first and second measurement points.

15. The deformation monitoring system of claim 1, wherein the controller is arranged to cause the deformation monitoring system to obtain images of the first and second measurement points at further times, subsequent to the second time, until a failure to determine a location of at least one of the measurement locations.

16. The deformation monitoring system of claim 1, further comprising an accelerometer or magnetometer, the controller being arranged to determine an orientation of the first and/or second camera based on an output of the accelerometer or magnetometer.

17. The deformation monitoring system of claim 1, further comprising an alignment system arranged to project alignment markings proximate the object, wherein the alignment system comprises a laser arranged to project an alignment marking proximate the object, wherein the alignment markings denote a limit of a measurement volume of the first and second cameras and/or a centre of the measurement volume.

18. The deformation monitoring system of claim 1, wherein the controller is arranged to carry out a validation function, the validation function comprising: recognising a validation object; measuring a distance between first and second measurement points on the validation object; and comparing the measured distance to a known value for the distance between the first and second measurement points on the validation object, wherein the controller is arranged to repeat the measuring and comparing steps of the validation function until a failure to determine a location of at least one of the first and second measurement locations.

19. The deformation monitoring system of claim 1, wherein the controller is arranged to record at least one of: the images from the first and second cameras, the locations of the first and second measurement points, and the determined deformation.

20. The deformation monitoring system of claim 1, wherein the controller is arranged to identify an identifier from the images from the first and/or second camera.

21. A method of monitoring deformation of an object using the deformation monitoring system of claim 1, the method comprising: providing an object having a first measurement point and a second measurement point; imaging the first measurement point and the second measurement point with a first camera; imaging the first measurement point and the second measurement point with a second camera; determining the locations of the first and second measurement points based on the imaging by the first and second cameras; deforming the object to produce a deformed object having deformation measurement points; imaging the first deformation measurement point and the second deformation measurement point with the first camera; imaging the first deformation measurement point and the second deformation measurement point with the second camera; determining the locations of the first and second deformation measurement points based on the imaging by the first and second cameras; and determining deformation of the object based on the locations of the first and second measurement points and the locations of the first and second deformation measurement points.

* * * * *